April 6, 1926.

G. G. CLARK

LOCK WASHER

Filed Dec. 3, 1923

1,580,015

Inventor
GLEN G. CLARK

By A. S. Johnson
Attorney

Patented Apr. 6, 1926.

1,580,015

UNITED STATES PATENT OFFICE.

GLEN G. CLARK, OF DEVILS LAKE, NORTH DAKOTA.

LOCK WASHER.

Application filed December 3, 1923. Serial No. 678,203.

*To all whom it may concern:*

Be it known that I, GLEN G. CLARK, a citizen of the United States, residing at Devils Lake, in the county of Ramsey and State of North Dakota, have invented certain new and useful Improvements in Lock Washers, of which the following is a specification.

My invention relates to improvements in lock washers for bolts, its object being to provide a washer which will constitute a lock between the head of the bolt and the wood work through which the bolt passes, preventing turning of the bolt as a nut is adjusted upon the projecting end of the bolt upon the other side of the wood work. Another object is to make a reversible lock washer having lugs extending from either side thereof to engage a bolt head or to enter and engage a body against which the bolt head is drawn, reversibly. To this end, my invention consists in the construction, combination, and arrangement of parts hereinafter set forth and claimed.

In the accompanying drawings, forming part of my invention:

Figure 1:
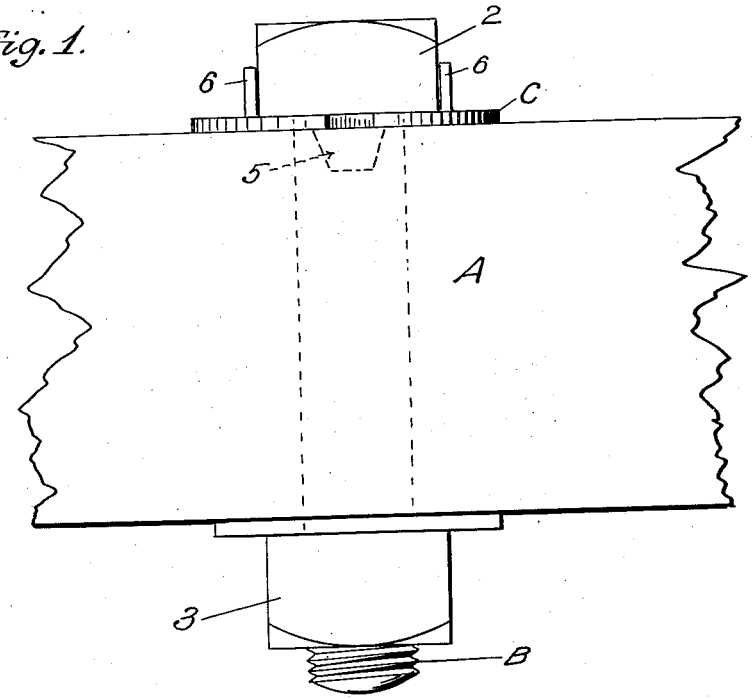
Figure 1 shows my invention applied to a bolt, with the bolt shown passing through a beam.
Figure 2:
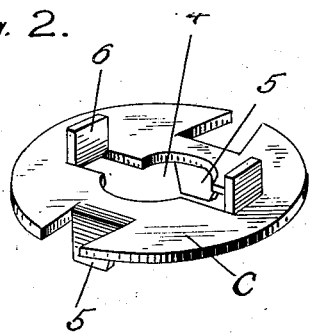
Figure 2 is a detail view of my improved washer.
Figure 3:
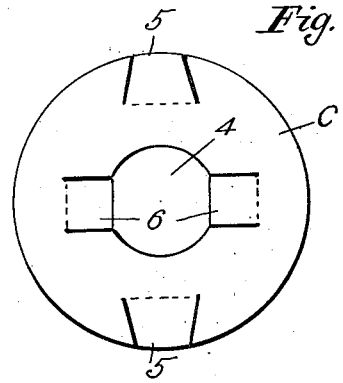
Figure 3 is a view of the washer blank.

Referring to the drawings, A represents frame work, as a timber, and B a bolt passing therethrough, the bolt on one end being formed with the usual head 2, and having its opposite end screw threaded to receive the usual nut 3.

My invention consists in a washer C, formed with a central opening 4, through which the bolt passes. The washer is formed with a pair of lugs 5, projecting from one side of the washer, as illustrated in Figure 1, and a second pair of oppositely directed lugs 6 projecting from the other side of the washer, the diametric distance between lugs 6 is the same as that between lugs 5. That being true, it is apparent that either pair of lugs may be used to grasp the bolt head or to enter and engage the woodwork reversibly, as desired.

In use, the washer is positioned upon the outer surface of the frame work, with either lugs 5 or lugs 6 adjacent the frame work, and the bolt head seated between the other pair of lugs. The nut 3 may then be screwed onto the threaded end of the bolt and the oppositely disposed lugs 5 and 6 will prevent the rotation of the bolt head and bolt, permitting tightening of the nut. As the nut is drawn tight the lugs adjacent the woodwork will be forced to enter and engage the woodwork, firmly anchoring the washer to the woodwork to prevent turning of the bolt head.

My invention is particularly designed for use in connection with freight cars, and the like, wherein it has heretofore been necessary for one man to stand upon the outer side of the woodwork, as the door or roof of the car, and hold the head of the bolt while a second man with a wrench stood upon the other side and turned the nut. The necessity of a man for holding the bolt in tightening the nut is eliminated by the use of my invention.

I claim:

A lock washer, comprising a plate having a central bolt receiving opening, a plurality of slits extending outwardly from the central opening to define a pair of lugs, said lugs being bent outwardly from one side of the plate substantially at right angles, a plurality of slits extending inward from the periphery of the plate to define a pair of lugs, said lugs being bent away from the plate substantially at right angles and oppositely to the first mentioned pair of lugs, both pairs of lugs being bent away from the plate equi-distant from the center of said opening, for the purpose set forth.

In testimony whereof I affix my signature.

GLEN G. CLARK.